US007543229B2

(12) United States Patent
Peiro et al.

(10) Patent No.: US 7,543,229 B2
(45) Date of Patent: Jun. 2, 2009

(54) ANALYSIS OF GRAPHIC DESIGN MATERIAL

(75) Inventors: Jose Abad Peiro, Barcelona (ES);
Yacoub Sherif, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 780 days.

(21) Appl. No.: 11/190,377

(22) Filed: Jul. 26, 2005

(65) Prior Publication Data

US 2006/0236237 A1    Oct. 19, 2006

Related U.S. Application Data

(60) Provisional application No. 60/671,268, filed on Apr. 14, 2005.

(51) Int. Cl.
*G06N 3/00* (2006.01)

(52) U.S. Cl. .................................................... 715/243

(58) Field of Classification Search .................. 715/234, 715/243, 254, 255
See application file for complete search history.

(56) References Cited

OTHER PUBLICATIONS

"Adobe(r) InDesign(r) CS: User Guide," Adobe, 2003, pp. 86-91 and 327.*
Botello, "Adobe(r) InDesign(r) CS2—Revealed," 1.1.2005.*
"Adobe(r) InDesign(r) 2.0 Classroom in a Book(r) for Windows and Mac OS," Adobe, 2002.*

* cited by examiner

*Primary Examiner*—Stephen S Hong
*Assistant Examiner*—Kyle R Stork

(57) ABSTRACT

The analysis of graphic design material is discussed, and a system and adaptive method to automatically analyze graphic design material are disclosed. Aspects to be measured within a document containing the graphic design material are determined. Measurements of these aspects are performed. Output is prepared, wherein the output comprises an image of a page within the document and a view of measured aspects associated with the page, wherein the view is selected from among a group of views including a semantic view, a cluster view, a graphical view, or a poster view.

16 Claims, 6 Drawing Sheets

ANALYSIS OF GRAPHIC DESIGN MATERIAL

RELATED APPLICATIONS

This patent application claims priority to U.S. patent application Ser. No. 60/671,268, titled "Analysis of Graphic Design Material", filed on Apr. 14, 2005 by the same inventors, commonly assigned herewith, and hereby incorporated by reference.

TECHNICAL FIELD

The present disclosure relates generally to analysis of graphic design materials, and more particularly to systems and methods by which an assessment of the quality of graphic design content may be understood, evaluated and presented to a design professional in an automated manner.

BACKGROUND

Professional graphic designers are skilled in reviewing graphic design material and visually identifying aspects of both good and bad design qualities. For example, by studying the printed output proof of a magazine, a graphic design professional can recognize potential problems with design layout, fonts, formatting and other factors before moving into press production. Such problems occur with greater frequency within large, collaborative projects, wherein content is derived from a plurality of sources. In particular, where content is generated by different individuals or groups, graphic designers may need to apply unifying standards to achieve a "clean" overall appearance.

However, the large quantity of graphic content generated, the high degree of sophistication of the design aspects, and the increasing workload on these professionals mean that it is becoming progressively more expensive to proofread graphic design content, i.e., more time from highly experienced staff is required. This is particularly true of serial publications with hard-to-meet deadlines. In such an environment, a quality control procedure must be in place that is able to process many pages of complex graphic design material very rapidly and very accurately.

Accordingly, improved systems and methods configured to analyze graphic design material and to provide an assessment of those materials to a design professional in an automated manner would be well received.

SUMMARY

The analysis of graphic design material is discussed, and a system and method configured to automatically analyze graphic design material are disclosed. Aspects to be measured within a document containing the graphic design material are defined and determined. Measurements of these aspects are performed. Output is prepared, wherein the output for a page or a number of pages comprises an image of a page within the document and a view of measured aspects associated with the page, wherein the view is selected from among a group of views including a semantic view, a cluster view, a graphical view, and/or a poster view.

BRIEF DESCRIPTION OF THE DRAWINGS

The following description refers to the accompanying figures. In the figures, the left-most digit(s) of a reference number identifies the figure (Fig.) in which the reference number first appears. Moreover, the same reference numbers are used throughout the drawings to reference like features and components.

DETAILED DESCRIPTION

Figure 1:
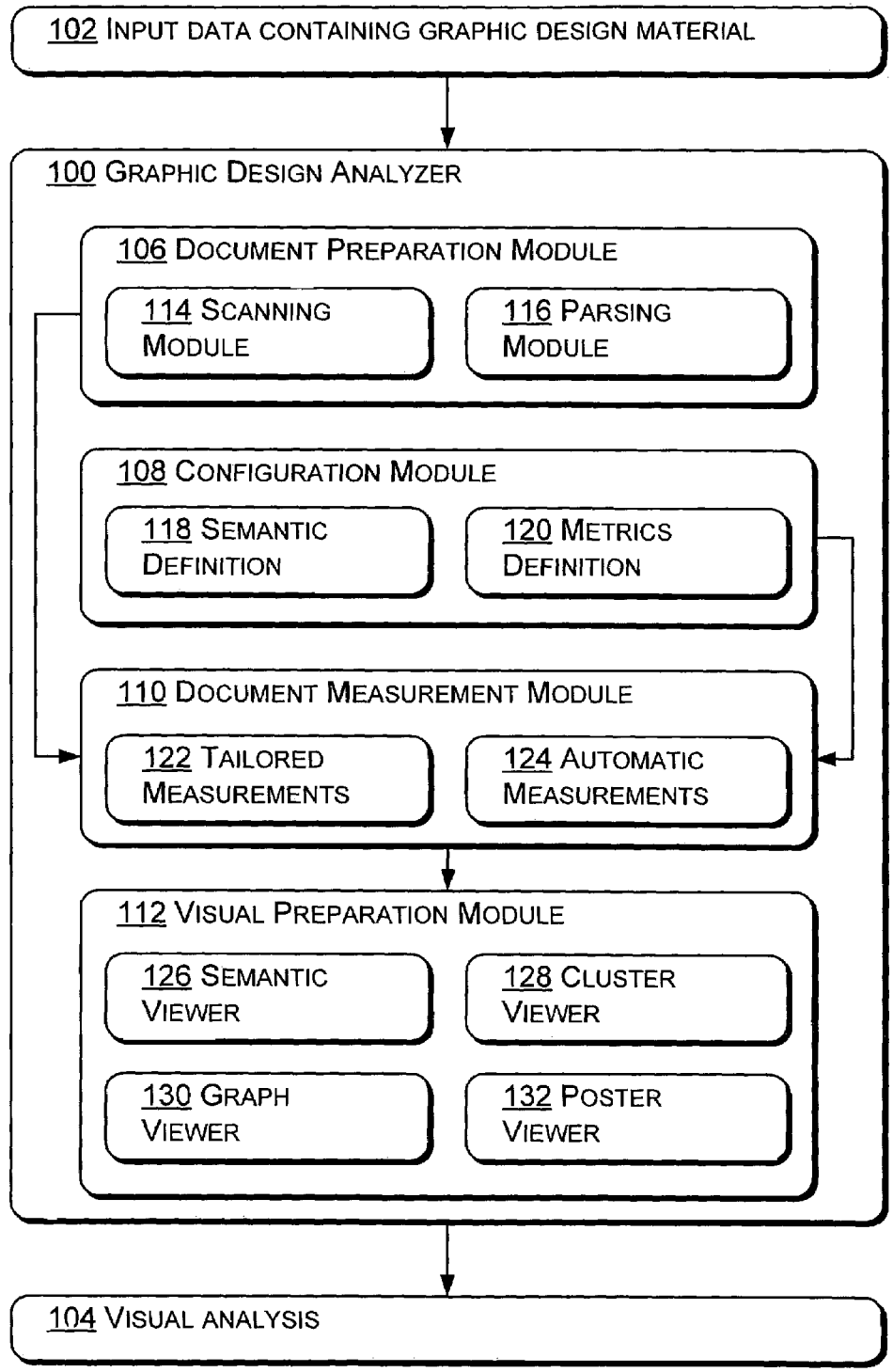
FIG. 1 is a block diagram showing an example of a graphic design analyzer.

FIG. 1 shows an example of an implementation of a graphic design analyzer 100. The graphic design analyzer 100 is configured to analyze aspects of the graphic design of a document in an automated fashion. The graphic design analyzer 100 can be configured for inclusion within a printer or other output device, and thus may reside within the printing pipeline. Alternatively, the graphic design analyzer 100 may reside on a workstation, server and/or other computing device. In particular, where the graphic design analyzer 100 is installed within, or with access to, a large format printer, e.g. a printer capable of printing on A0 paper, then the output may include a poster providing graphic design analysis on a plurality of pages of a large document.

In the example of FIG. 1, input data 102 containing graphic design materials are sent to the graphic design analyzer 100. Input data 102 may be organized in any of a variety of formats. For example, the input data may include a data file (e.g. a PDF file (Adobe's® portable document format)) or may include hardcopies (printed-paper input). The input data 102 are processed by the graphic design analyzer 100 to create output, illustrated in the example of FIG. 1 as a visual analysis 104. The visual analysis 104 may take many forms, including a semantic analysis, a cluster analysis or an advertising analysis. The visual analysis 104 may be printed on a large format media (e.g. A0 size paper) to facilitate proofing of the layout consistency, and as a means to ensure the overall graphic design quality. Non-expert users of the system can verify, learn and decide on the quality of material simply by looking at the output provided by the visual analysis 104, which may be printed in a poster format, e.g. A0 size paper. When printing in a poster format, a reduced size image of each page within the input document 102 may be printed together (e.g. side-by-side) with a view of measured aspects associated with that page. As will be discussed below, the view may include a semantic view, a cluster view or a graphical view (e.g. an advertising analysis).

In the example of FIG. 1, the graphic design analyzer 100 includes several component parts. The component parts are illustrated to provide a preferred configuration; however, considerable rearrangement of the component parts could be resorted to, while still practicing the instant disclosure. A document preparation module 106 is configured to provide measurable data in an expected format to a document measurement module 110. A configuration module 108 is configured to provide to the document measurement module 110 definitions governing aspects within the input data 102 to be measured. The document measurement module 110 is configured to make the actual measurements in an automated fashion, and to pass the output to the visual preparation module 112. The visual preparation module 112 is configured to create output, typically in a printed format such as visual analysis 104, indicating the results of the graphic design analysis.

In the example of FIG. 1, the document preparation module 106 includes a scanning module 114 and a parsing module 116. The scanning module 114 may be configured in several different ways, depending on the particulars of the application. For example, the scanning module 114 may be configured to receive data from an optical scanning device, such as are used when scanning hard copies of printed documents. Alternatively, the scanning module 114 may be configured to open and scan data files containing documents, such as documents in the PDF format. In either case (or alternative implementations), the scanning module 114 obtains graphic design content. The graphic design content obtained is converted into a data file format or data structure that can be parsed and further processed.

In the example of FIG. 1, the parsing module 116 is configured to parse the data obtained by the scanning module 114. The parsing process identifies elements for potential measurement. Such elements include words, lines, images, zones and clusters of zones. Zones may be defined in a flexible manner, according to the specific configuration of the graphic design analyzer. For example, zones may include areas of related text and/or images, such as an article or a portion thereof. Thus, by parsing the data obtained from the scanning module 114, the parsing module 116 identifies and catalogs the element within the data for possible measurement, classification and/or display.

The configuration module 108 provides the document measurement module 110 with definitions governing aspects within the input to be measured. The configuration module 108 may be customized to a user, such as a graphics design professional, to include those aspects of graphic design the user would like to measure within the document. Alternatively, the user may elect to allow the configuration module 108 to default to a standard group of aspects to be measured. In the example of FIG. 1, the configuration module 108 includes a semantic definition 118 and a metrics definition 120. The user may customize either definition, or accept either definition's default values. The semantic definition 118 defines the use of zones and arrows or other indicators used to perform a semantic analysis (discussed more fully with respect to FIG. 2). The semantic analysis provides an overview by which the logical and sequential flow of reading is displayed from zone to zone within a document. This analysis helps, among other things, to predict the ease by which readers of the content will be able to recognize factors governing legibility, e.g. the intended sequence by which the various zones are intended to be read.

The metrics definition 120 includes information on what type of measurements should be made. In most applications, the metrics definition can be rather lengthy, and enumerates aspects that have an impact on graphic design quality. For example, many aspects may be included within the metrics definition 120, a small number of which include: the number of zones per page; the number of advertising zones (zones containing advertising); the average number of text lines per zone; the text density in different areas (such as zones or pages); the average font size; the number of different fonts in one or more areas; measurements of font variability; etc. Specific implementations of the metrics definition would depend on the needs of the user, and therefore the metrics definition 120 could be adjusted to fit the needs of any specific application.

The document measurement module 110 is configured to make the actual measurements, in an automated fashion, of the scanned and parsed document received from the document preparation module 106. The measurements are made according to the directions of the configurations module 108. Accordingly, the document measurement module 110 receives input from the document preparation module 106 and the configuration module 108, and provides output to the visual preparation module 112.

In the example of FIG. 1, the document measurement module 110 makes measurements of the scanned and parsed document of two general types, i.e. tailored measurements 122 and automatic measurements 124. The tailored measurements 122 are made in response to the specialized needs of the specific graphic design analysis, which may differ from more generalized examples of graphic design analysis. For example, in an academic publication, there may be a specific need to measure the use of footnotes. Accordingly, the measurement of footnotes would be included within the tailored measurements 122. Such measurements would might not be generally be made, since footnotes are not present in most commercial publications of the popular press.

In the example of FIG. 1, the automatic measurements module 124 makes measurements of aspects typically present in most graphic design material. For example, the automatic measurements include those measurements made in response to the semantic definition 118 and the metrics definition 120.

The visual preparation module 112 is configured to create output, typically in a printed format, indicating the results of the graphic design analysis. When output is printed in a poster format on large size paper, many pages of the input document, together with a graphic design analysis of each page, will be printed on a single page of the output. The output typically includes a copy of a page of the input document printed in a reduced size, side-by-side the analysis of the graphic design of that page. Typically, the analysis of the graphic design includes the measurements made by the document measurement module 110. In the example of FIG. 1, the visual preparation module 112 includes four component parts, the semantic viewer 126, the cluster viewer 128, the graph viewer 130 and the poster viewer 132.

Figure 2:
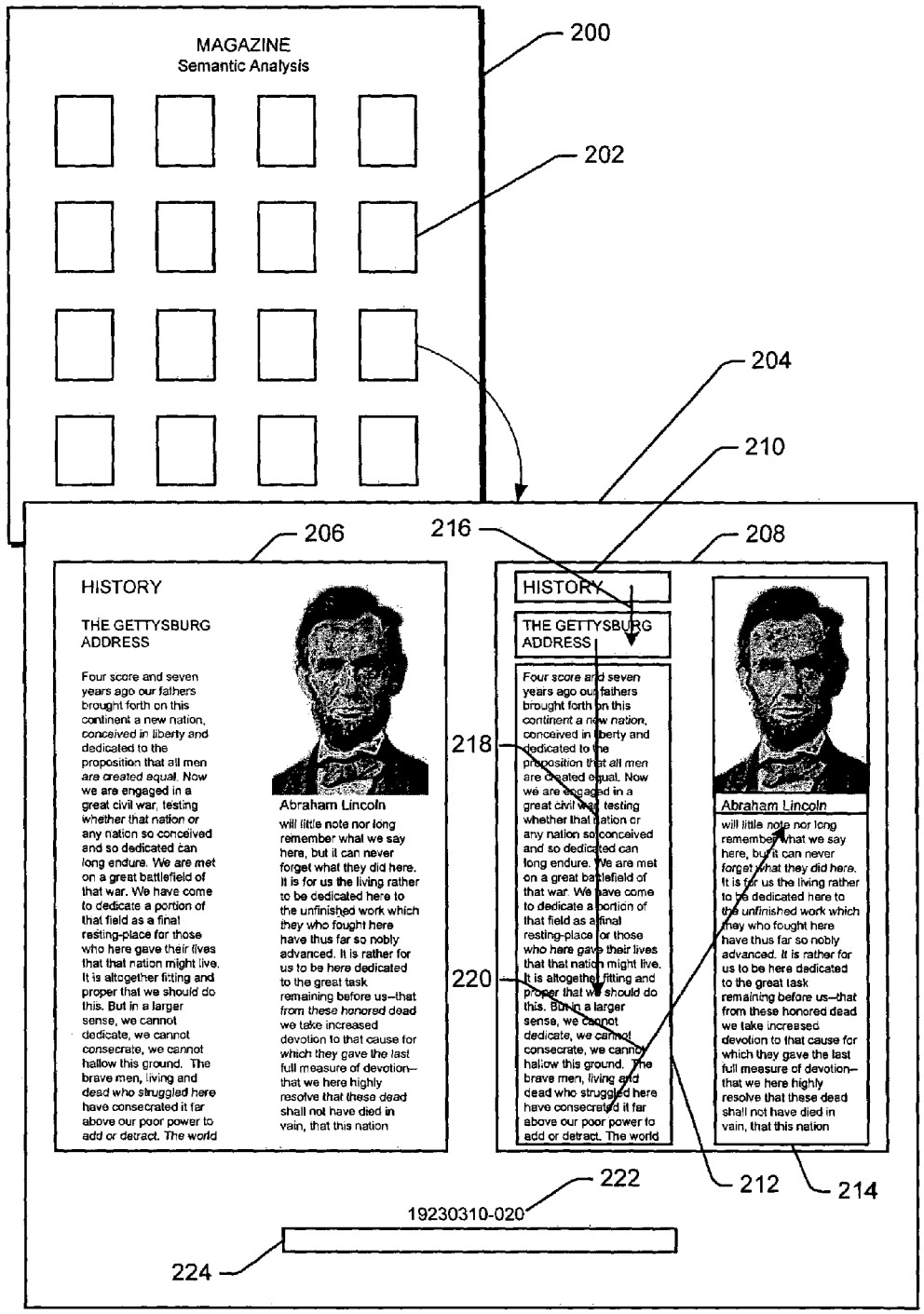
FIG. 2 is a somewhat diagrammatic view showing a poster illustrating a semantic analysis of many pages of a document, wherein one page is shown in enlarged detail.

The semantic viewer 126 creates output, an example of which is seen in FIG. 2, wherein the document is annotated (such as by use of arrows) to indicate the logic (or lack thereof) of the sequence, size, shape and positioning of the zones within which content is contained. In particular, output indicating the ease (or difficulty) by which a viewer of the document may understand the relationship of the zones—including particularly their sequential relationship—is presented. Thus, by viewing the output (e.g. FIG. 2) of the semantic viewer 126, it may quickly be understood whether the zones of the document are shaped, arranged and positioned in a manner that is consistent with good graphic design practice. In one implementation of the semantic viewer 126, the output includes the use of arrows that rapidly convey information to anyone reviewing the quality of the semantic design. In particular, the arrows disclose, to the viewer of the graphic design analysis, a path, i.e. a logical reading order, "flow" or "text flow," that the reader must follow when reading the content included within a plurality of zones. Thus, a simple arrow pattern having a conventional appearance typically indicates that the reader will have little difficulty in finding the next zone in a sequence of zones. A more complex arrow pattern may indicate, to the viewer of the graphic design output, that the reader may have trouble in finding a second zone upon completion of a first a zone. Additionally, a large number of arrows and/or an unusual arrow pattern can also indicate that graphic design will not result in a satisfactory experience for the reader. Accordingly, the semantic viewer 126 provides a graphic design analysis that is a measurement of the quality of the graphic design of the input document.

Figure 3:
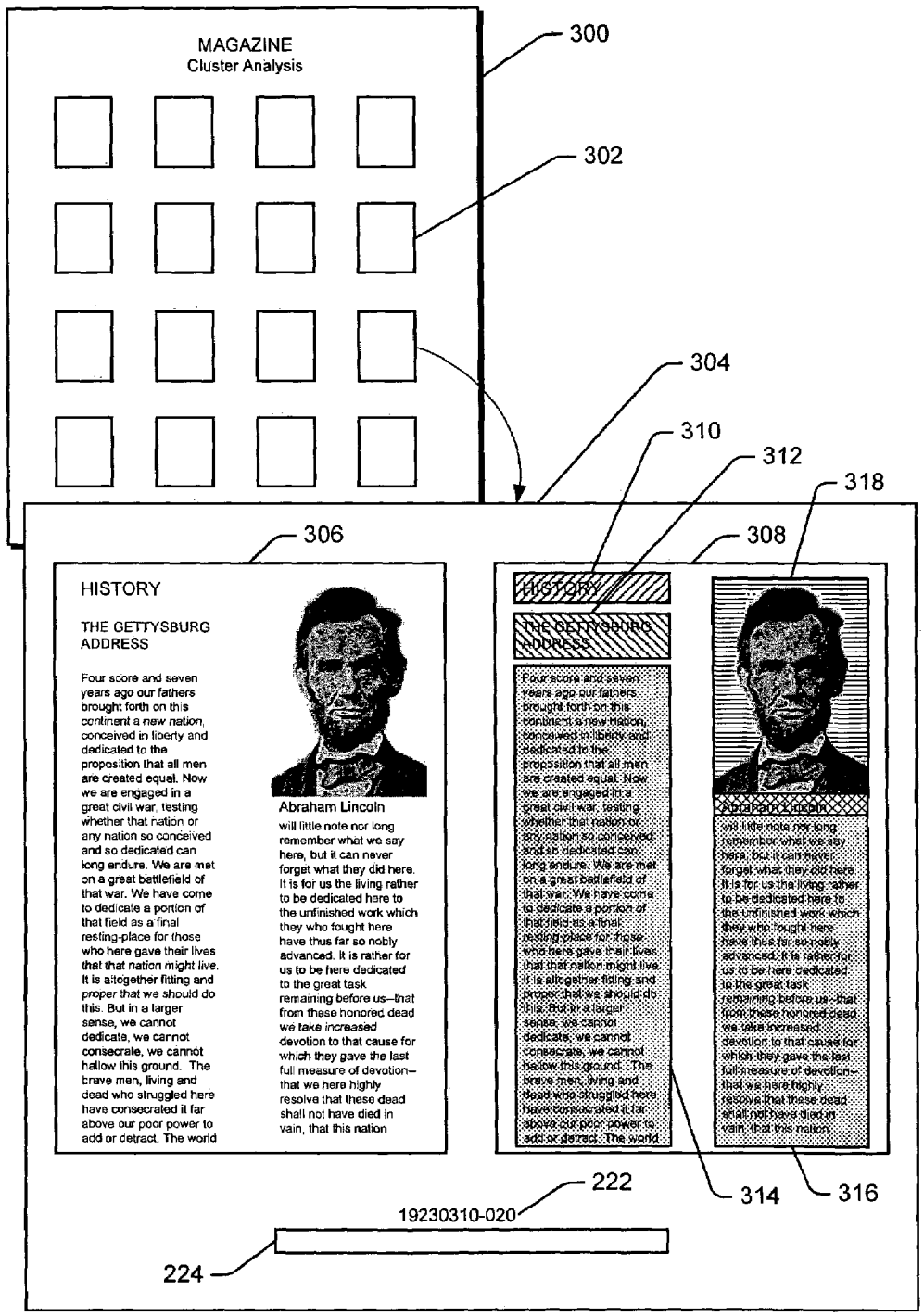
FIG. 3 is a somewhat diagrammatic view showing a poster illustrating a cluster analysis of many pages of a document, wherein one page is shown in enlarged detail.

The cluster viewer 128 creates output, an example of which is seen in FIG. 3, wherein the document is annotated (such as by use of color to highlight zones) to indicate the logic (or lack thereof) of the similarity of the graphic design of the different zones within which content is contained. In particular, output indicating the relationship of the zones—including, for example, their consistent use of fonts and formatting—is presented. Thus, by viewing the output (e.g. FIG. 3) of the cluster viewer 128, it may quickly be understood whether the zones of the document include consistent use of font type, font size, paragraph formatting and other graphic variables in a manner that is consistent with good graphic design practice. In one implementation of the cluster viewer 128, the output includes the use of color or hash marks that rapidly convey information to anyone reviewing the quality of the semantic design. For example, the color or hash marks provide ready confirmation of the similarity of the font, formatting and other aspects of different zones, allowing the viewer to understand quickly whether a consistent graphic design strategy has been followed. In particular, like colors or hash marks applied to two (or more) zones indicate like graphic design, e.g. like fonts, font sizes, formatting, etc. However, dissimilar colors or hash marks applied to two (or more) zones indicate differences in the graphic design of the zones, perhaps indicating differences in the fonts, font sizes or formatting. Thus, the cluster viewer 128 provides an efficient way in which to evaluate aspects of graphics design quality.

Figure 4:
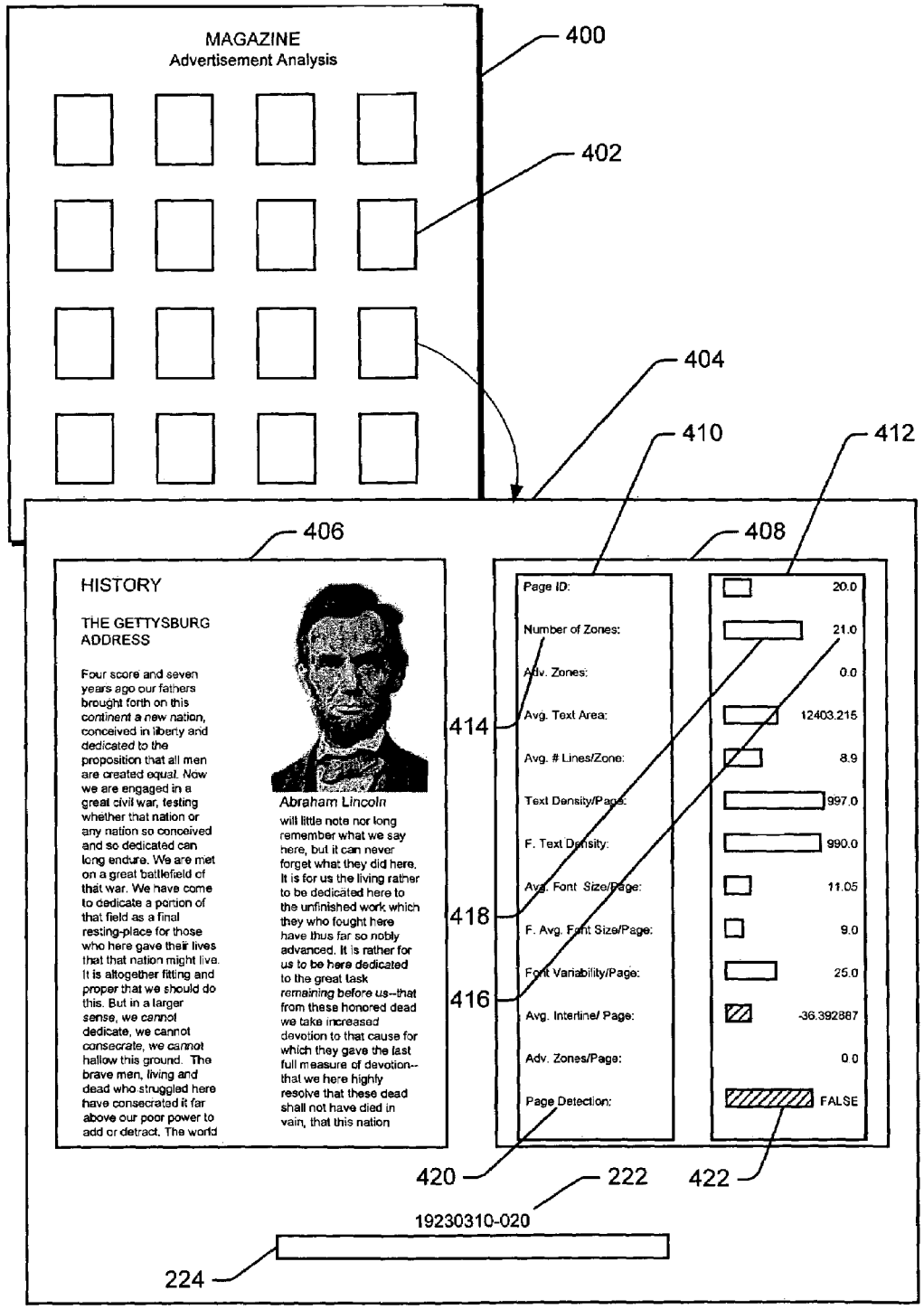
FIG. 4 is a somewhat diagrammatic view showing a poster illustrating a graphic analysis of many pages of a document, wherein one page is shown in enlarged detail.

The graph viewer 130 creates output, an example of which is seen in FIG. 4, wherein a plurality of indices, such as numerals, Boolean characters, alpha numeric characters and/ or bar graphs are used to indicate aspects of the graphic design of a page (or other portion) of a document. In particular, aspects such as number of zones, number of advertising zones, average lines of text per zone, font variability/page, and other aspects, are presented. Thus, by viewing the output (e.g. FIG. 4) of the graph viewer 130, a plurality of valuable indices, that would otherwise required time and diligent effort on the part of a graphic design professional to produce, may be seen and quickly understood. In one implementation of the graph viewer 130, the output includes a combination of bar graphs and numeric or Boolean values that rapidly convey information to anyone reviewing the quality of the graphic design. Thus, bar graphs allow the viewer to understand quickly many important facts about the graphic design content of a document.

The poster viewer 132 creates output, examples of which are seen in FIGS. 2-4, wherein reduced size (e.g. 'thumbnail') views of many different pages of a document are shown simultaneously on a large format printout. Each page is displayed with a counterpart, selected from among those created by the semantic viewer 126, the cluster viewer 128 or the graph viewer 130. Therefore, the poster viewer 132 creates output configured for viewing a plurality of pages from within a document, along with a counterpart associated with each page that conveys graphic design information associated with that page. Accordingly, the poster viewer 132 may be used to create poster views associated with the semantic view, the cluster view or the graph view produced by the semantic viewer 126, the cluster viewer 128 and the graph viewer 130, respectively.

FIG. 2 is a somewhat diagrammatic view showing a poster 200 illustrating a semantic analysis of many pages 202 associated with the input data 102 (FIG. 1). The semantic output 204 associated with a single page is enlarged to show detail. Referring momentarily to FIG. 1, the semantic output 204 may have been generated by the semantic viewer 126, using instructions given by the semantic definition 118. Returning to FIG. 2, the semantic output 204 includes a reproduction 206 of the content of the page, as well as a semantic counterpart to the original content, i.e. the semantic view 208. The semantic view 208 includes the content of the original document, and is additionally annotated to illustrate the logical flow, or sequence, by which zones within the page are read. In particular, demarcation of the zones (e.g. zones 210, 212 and 214) is shown by a perimeter line. The demarked zone may include a single word (e.g. a title) or several related paragraphs of text. Note that the zones could alternatively be indicated by color, hash marks, or any other method, as desired. The sequence by which a reader will traverse the zones is shown by arrows 216-220. The semantic output may also include a designator 222 and barcode 224, which allow the user to find the original page within the original document. For example, the designator indicates that the page in question is from page 20 of a periodical publication published on Mar. 10, 1923.

The semantic definition 118 (FIG. 1) may also include rules for defining zones within the document and rules for linking at least some of the zones with arrows. Additionally, rules may govern the interpretation of the arrows linking the zones. In particular, the rules may recognize some configurations of zones and arrows that probably represent poor graphic design. For example, the semantic definition 118 (FIG. 1) may include rules governing maximum numbers of zones and arrows per page, since a page that is too complex may represent poor graphic design. Such a rule would flag overly complex pages, wherein the user is presented with a maze of zones, and wherein the sequence by which the zones are to be read is not clear.

FIG. 3 is a somewhat diagrammatic view showing a poster 300 illustrating a cluster analysis of many pages 302 associated with the input data 102 (FIG. 1). The cluster output 304 associated with a single page is enlarged to show detail. The cluster output 304 may have been generated by the cluster viewer 128 (FIG. 1). The cluster output 304 includes a reproduction 306 of the content of the page, as well as a cluster counterpart to the original content, i.e. the cluster view 308. The cluster view 308 includes the content of the original document, and is additionally annotated to illustrate the similarities and differences between the zones within the page. In particular, the zones (e.g. zones 310-318) are defined within the cluster view 308, wherein each zone may include a single word (e.g. a title) or several related paragraphs of text. Note that the zones could be indicated by color, line marking or other indicia, as desired. It is a significant aspect of the cluster view 308 that zones having similar or the same font type, font size, line spacing (and/or other characteristics as defined and desired) are similarly colored or otherwise indicated. Conversely, zones having different design characteristics will be differently colored or shaded. This allows a graphics design professional, by quickly confirm that two zones have the same color (or line markings), to confirm that an arbitrarily defined list of characteristics, such as font size or line spacing, is the same between the zones. Note that the configuration module 108 (FIG. 1) can be configured to set the arbitrarily defined list of characteristics to any set of characteristics desired. Such characteristics typically involve font type, font size, paragraph formatting (e.g. indentation, justification, line spacing, etc.), and other aspects.

FIG. 4 is a somewhat diagrammatic view showing a poster 400 illustrating a graphic analysis 402 associated with the input data 102 (FIG. 1). The graphic output 404 associated with a single page is enlarged to show detail. The graphic output 404 may have been generated by the graphic viewer 130 (FIG. 1). The graphic output 404 includes a reproduction 406 of the content of the page, as well as a graphic counterpart to the original content, i.e. the graphic view 408. The graphic view 408 includes a list 410 of aspects, such as number of zones, number of advertising zones, etc., which have been measured by the document measurement module 110. Associated the list 410 of measured aspects is a list 412 of measured values. In particular, each measured aspect 414 on the list 410 is associated with a measured value 416 on list 412. Additionally, the measured value 416 may be associated with a graphical view, such as a bar graph 418.

An aspect labeled "page detection" 420 refers to whether or not an advertisement has been detected on the page. In the implementation of FIG. 4, measurement of page detection 420 is a Boolean function, wherein a block 422 may be red (or otherwise depicted) if an advertisement is detected, and green (or otherwise depicted) if no advertisement is detected. Detection of an advertisement is a threshold question, in that different graphic design rules tend to apply to advertisements than are applied to articles.

Figure 5:
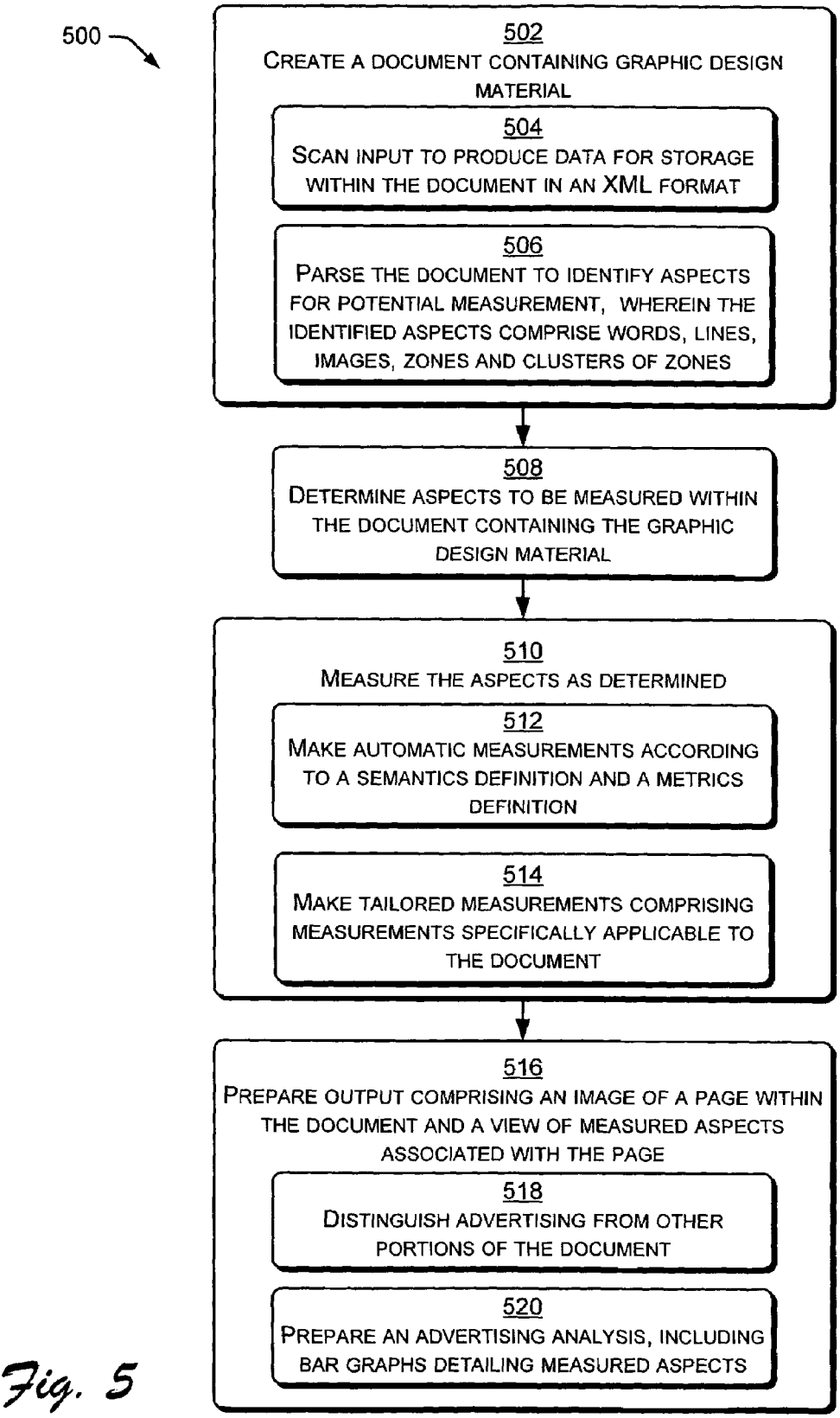
FIG. 5 is a flow diagram that describes an example of a method by which graphic design material may be analyzed.
Figure 6:
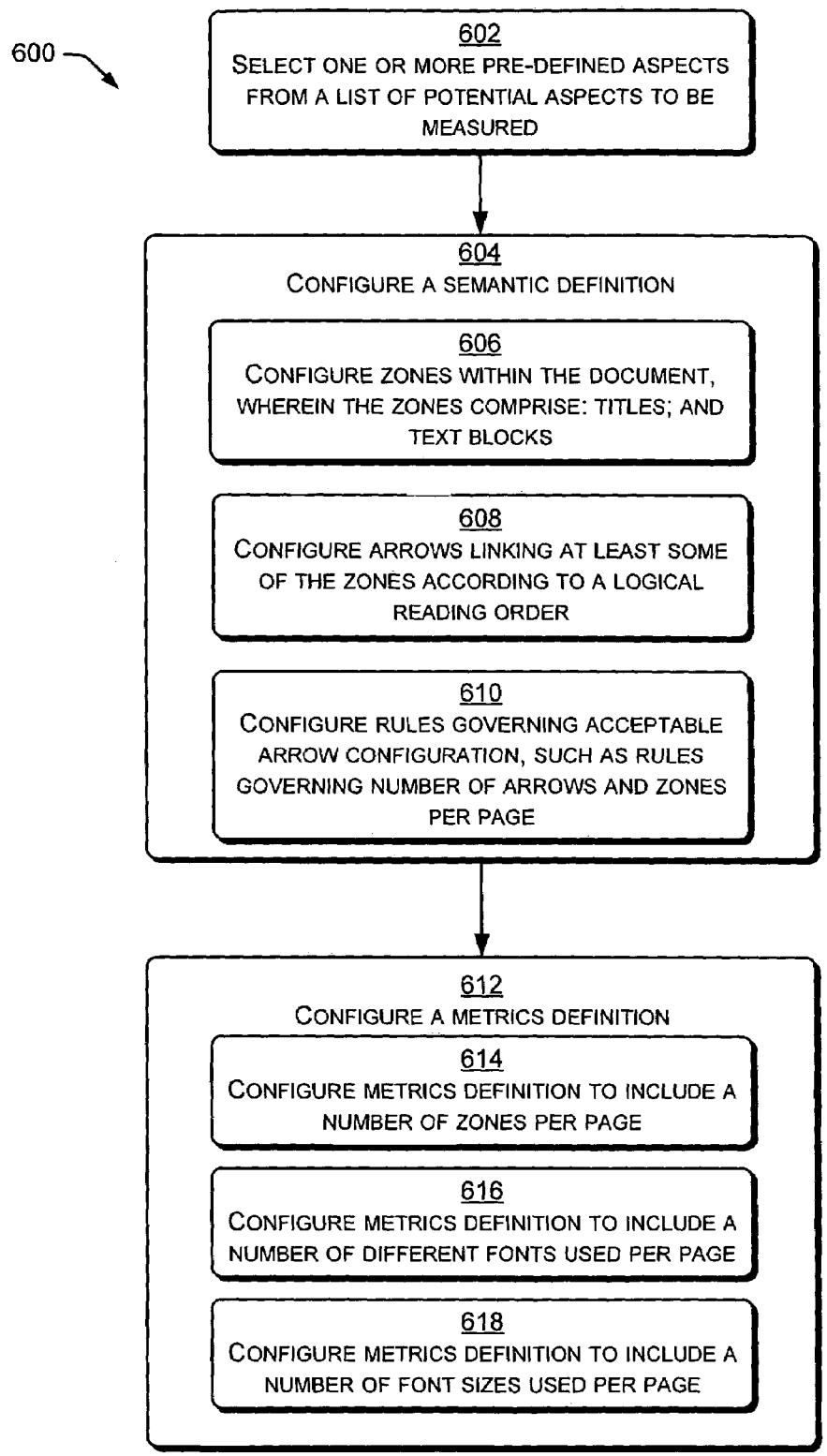
FIG. 6 is a flow diagram that describes an example of a method by which it may be determined which aspects are to be measured within a document containing graphic design material.

FIGS. 5 and 6 describe the operation of the system 100 of FIG. 1 in flowchart form. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure. In particular, the flow charts of FIGS. 5 and 6 illustrate a further exemplary implementations, wherein a method 500 is employed to analyze graphic design material and wherein a method 600 is employed to determine which aspects are to be measured within a document containing graphic design material. The elements of the method may be performed by any desired means, such as by the execution of processor-readable instructions defined on a processor-readable media, such as a disk, a ROM or other memory device or by operation of an application specific integrated circuit (ASIC) or other hardware device. In one implementation, the ROM may contain firmware implementing the graphic design analyzer module 100 of FIG. 1 according to an exemplary method as seen in the flow chart of FIGS. 5 and 6. In an alternative implementation, an ASIC may contain logic that implements the graphic design analyzer module 100 according to an exemplary method as seen in the flow chart of FIGS. 5 and 6. While the blocks are described sequentially, the actions described in any block may be performed in parallel with actions described in other blocks, may occur in an alternate order, or may be distributed in a manner that associates actions with more than one other block.

Referring to FIG. 5, at block 502, a document is created containing graphic design material. The document may be created by the document preparation module 106 of FIG. 1, or an alternative structure. The document creation may be performed using one or more techniques, two of which are listed here, and others of which are seen within other locations of this specification, or may be envisioned in light of the teachings herein. At block 504, input is scanned to produce data for storage within the document in an XML format. The scanning process may include optical scanning of a printed document, or electronic scanning of a document in a format such as PDF (Adobe's® portable document format). For example, the scanning module 114 of FIG. 1 is adapted to scan a printed document, and to produce data in any desired format, such as XML. Additionally or alternatively, at block 506, the document is parsed to identify aspects for potential measurement, wherein the identified aspects comprise words, lines, images, zones and clusters of zones. As an example, the parsing module 116 of FIG. 1 is configured to parse a document, such as an XML document, and identify aspects for measurement.

At block 508, aspects to be measured within a document containing the graphic design material are determined. In the example of FIG. 1, the configuration module 108 is configured to determine aspects within the document to be measured. As discussed, the semantic definition 118 and the metrics definition 120 may be used to configure the graphic design analyzer 100 to measure the aspects of the document that are of particular concern.

At block 510, the aspects, determined at block 508, are measured. This may be performed in a number of ways, two of which are listed here, and others of which are seen within other locations of this specification, or may be envisioned in light of the teachings herein. For example, at block 512, automatic measurements are made according to a semantics definition 118 (FIG. 1) and a metrics definition (120 FIG. 1). For example, the measurements may configure zones within the document, or utilize zones already configured within the document. The automatic measurements may include measurement and/or identification of fonts, font sizes and font families. The automatic measurements may measure font characteristics, including inter-character spacing or kerning, font encodings, and any other spacing properties such as inter-word, inter-line, inter-paragraph, indenting, etc. Additionally or alternatively, at block 514 tailored measurements are made, which may include measurements specifically applicable to the document. For example, when processing legal documents a measurement can be specifically defined that is consistent with legal filing requirements.

At block 516, output including an image of a page within the document and a view of measured aspects associated with the page is prepared. The output may include an image of a page within the document and a view of measured aspects associated with the page. In particular, the measured aspects associated with the page may be selected from among the semantic view, the cluster view, the graphical view and/or the poster view. Examples of the semantic view, the cluster view and the graphical view are seen in FIGS. 2, 3 and 4, respectively. Examples of the poster view are seen in FIGS. 2-4. In one implementation, when the page includes advertising, aspects of preparing the output may be refined. In particular, at block 518, advertising is distinguished from other portions of the document. At block 520, an advertising analysis, in some cases including bar graphs detailing the measured aspects is prepared. An example of this type of analysis is seen at 408 in FIG. 4.

FIG. 6 is a flow diagram 600 that describes an example of a method by which it may be determined which aspects are to be measured within a document containing graphic design material. Accordingly, aspects of the discussion of FIG. 6 may be viewed as an expansion of the discussion of block 508 of FIG. 5.

At block 602, one or more pre-defined aspects are selected from a list of potential aspects to be measured. Examples of the aspects presented to a user on the list include font type measurements, font size measurements, line spacing measurements, etc. Because many aspects of graphics design are routinely checked, it is convenient to have a list of pre-defined aspects, from which a user may select. The selection may be incorporated into standard user interface dialog boxes, and provides an efficient mechanism by which the user can select from among many potential aspects to be measured.

At block 604, a semantic definition is configured. In the example of FIG. 1, the configuration module 108 configures a semantic definition 118. Configuration of the semantics definition may be performed in a number of ways, two of which are listed here, and others of which are seen within other locations of this specification, or may be envisioned in light of the teachings herein. For example, at block 606 zones within the document are configured, wherein the zones include: titles, text blocks, tables, graphics and photos/pictures, and/or other structures. At block 608, arrows are configured linking at least some of the zones according to a logical reading order. An example of such a logical order may be seen in FIG. 2 wherein, the zones 212 and 214 are linked by the arrow 218, thereby indicating that the reader is to continue to zone 214 upon completion of zone 212. At block 610, rules governing acceptable arrow and zone configuration are developed. These rules may include rules governing the number of arrows and zones per page.

At block 612, a metrics definition is configured. In the example of FIG. 1, the configuration module 108 configures a metrics definition 120. Configuration of the metrics definition may be performed in a number of ways, three of which are listed here, and others of which are seen within other locations of this specification, or may be envisioned in light of the teachings herein. For example, at block 614 a metrics definition is configured to include a number of zones per page. At block 616, a metrics definition is configured to include a number of different fonts used per page. And, at block 618, a metrics definition is configured to include a number of font sizes used per page. Other aspects, including graphics, images, formatting and others could additionally be included within a definition.

Although the above disclosure has been described in language specific to structural features and/or methodological steps, it is to be understood that the appended claims are not limited to the specific features or steps described. Rather, the specific features and steps are exemplary forms by which this disclosure may be implemented. For example, while actions described in blocks of the flow diagrams may be performed in parallel with actions described in other blocks, the actions may occur in an alternate order, or may be distributed in a manner which associates actions with more than one other block. And further, while elements of the methods disclosed are intended to be performed in any desired manner, it is anticipated that computer- or processor-readable instructions, performed by a computer and/or processor, typically located on a printer (or possibly a workstation, server or other computer device), reading from a computer- or processor-readable media, such as a ROM, disk or CD ROM, would be preferred, but that an application specific gate array (ASIC) or similar hardware structure, could be substituted.

The invention claimed is:

1. One or more computer-readable media comprising computer-executable instructions for analysis of graphic design material, the computer-executable instructions comprising instructions for:

determining aspects to be measured within a document containing the graphic design material;

measuring the aspects as determined; and preparing output comprising an image of a page within the document and a view of measured aspects associated with the page, wherein the view is selected from among a group of views comprising: a semantic view; a cluster view; a graphical view; or a poster view, wherein:

the semantic view comprises:

demarcation of a plurality of zones, wherein the demarcation of each zone is indicated by a perimeter line; and an arrow, indicating a sequential reading direction between two of the plurality of zones;

the graphical view provides an advertisement analysis, comprising bar graphs for data points comprising:

page detection;

number of zones;

advertising zones; and font data; and the cluster view comprises:

demarcation of a plurality of zones, wherein the demarcation of each zone is indicated by color;

wherein use of a same color within two zones implies similarity between the fonts used within the two zones.

2. The one or more media of claim 1, wherein determining aspects to be measured comprises selecting one or more pre-defined aspects from a list of potential aspects to be measured.

3. The one or more media of claim 1, wherein determining aspects to be measured comprises:

configuring a semantic definition, comprising:

zones within the document, wherein the zones comprise: titles; graphics, pictures, tables and text blocks; and arrows linking at least some of the zones according to a logical reading order; and configuring a metrics definition comprising:

a number of zones per page;

a number of different fonts used per page; and a number of font sizes used per page.

4. The one or more media of claim 1, wherein measuring the aspects comprises:

making automatic measurements according to a semantics definition and a metrics definition, wherein the automatic measurements comprise:

configuring zones within the document; and identifying fonts, font sizes, font families, and font characteristics including inter-character spacing; and making tailored measurements comprising measurements specifically applicable to the document.

5. The one or more media of claim 1, wherein the poster view comprises a plurality of pages from the document, each page associated with a counterpart; and wherein the counterpart is selected from among the semantic view the graphical view and the cluster view.

6. The one or more media of claim 1, wherein preparing the output comprises:

distinguishing advertising from other portions of the document; and preparing an advertising analysis, comprising bar graphs detailing measured aspects.

7. The one or more media of claim 1, additionally comprising creating the document containing graphic design material, wherein the creating comprises:

scanning input to produce data for storage within the document in an XML format; and parsing the document to identify aspects for potential measurement, wherein the identified aspects comprise words, lines, images, zones and clusters of zones.

8. One or more computer-readable media comprising computer-executable instructions for analysis of graphic design material, the computer-executable instructions comprising instructions for:
   creating a document containing the graphic design material in a format consistent with measurement of aspects of the graphic design material;
   determining which of the aspects to measure; measuring the aspects as determined; and
   preparing output of the measured aspects comprising a view selected from among a group of views comprising: a semantic view; a cluster view; a graphical view; or a poster view, wherein preparing the output comprises:
      distinguishing advertising from other portions of the document: and
      preparing, when advertising is distinguished, an advertising analysis, comprising bar graphs detailing measured aspects.

9. The one or more media of claim 8, wherein creating the document comprises:
   scanning input to produce data for storage within the document in a format suitable for parsing; and
   parsing the document to identify potentially measurable aspects.

10. The one or more media of claim 8, wherein determining which of the aspects to measure comprises:
   selecting one or more pre-defined aspects from a list of potential aspects to be measured;
   configuring a semantic definition, comprising:
      rules defining zones within the document and for linking at least some of the zones with arrows, wherein the linking is performed according to a logical reading order; and
      rules governing acceptable semantic graphic design, comprising rules governing maximum numbers of zones and arrows per page;
   configuring a metrics definition comprising an inventory of zones, fonts, and graphics.

11. The one or more media of claim 8, wherein measuring the aspects determined comprises:
   making automatic measurements according to a semantics definition and a metrics definition, wherein the automatic measurements comprise:
      configuring zones within the document; and
      identifying fonts, font sizes, and font characteristics; and
   making tailored measurements comprising measurements specifically applicable to the document.

12. The one or more media of claim 8, wherein:
   the semantic view comprises:
      demarcation of a plurality of zones, wherein the demarcation of each zone is indicated by a perimeter line; and
      an arrow, indicating text flow from a first of the plurality of zones to a second of the plurality of zones;
   the graphical view provides an advertisement analysis, comprising bar graphs for data points comprising:
      page detection;
      number of zones;
      advertising zones; and
      font data;
   the cluster view comprises:
      demarcation of a plurality of zones, wherein the demarcation of each zone is indicated by color;
      wherein use of a same color within two zones implies similarity between the fonts used within the two zones; and
   the poster view comprises:
      a plurality of pages from the document, each page associated with a counterpart;
      wherein the counterpart is selected from among the semantic view, the graphical view and the cluster view.

13. A computer comprising a graphic design analyzer, the graphic design analyzer comprising:
   a document preparation module comprising statements executable on the computer to scan input data to produce a document within which aspects may be identified for measurement;
   a configuration module comprising statements executable on the computer to determine which of the identified aspects will be measured;
   a document measurement module comprising statements executable on the computer to measure, according to the determination, aspects within the document; and
   a visual preparation module comprising statements executable on the computer to prepare output comprising an image of a page within the document and a view of measured aspects associated with the page, wherein the view is selected from among a group of views comprising:
      a semantic view, wherein the semantic view indicates text flow from one text zone to another text zone;
      a cluster view, wherein the cluster view colors zones in the document to imply similarity between fonts used in each zone; or
      a graphical view, wherein the graphical view provides an advertisement analysis comprising bar graphs for data points.

14. The graphic design analyzer of claim 13, wherein the configuration module comprises configurations for:
   selecting one or more pre-defined aspects from a list of potential aspects to be measured;
   configuring a semantic definition, comprising:
      rules defining zones within the document and for linking at least some of the zones with arrows, wherein the linking is performed according to a logical reading order; and
      rules governing acceptable semantic graphic design, comprising rules governing maximum numbers of zones and arrows per page; and
   configuring a metrics definition comprising an inventory of zones, fonts and graphics.

15. The graphic design analyzer of claim 13, wherein the document measurement module comprises configurations for:
   making automatic measurements according to a semantics definition and a metrics definition, wherein the automatic measurements comprise:
      configuring zones within the document; and
      identifying fonts and font sizes
      a logical reading flow; and
   making tailored measurements comprising measurements specifically applicable to the document.

16. The graphic design analyzer of claim 13, wherein the visual preparation module comprises configurations for:
   distinguishing advertising from other portions of the document; and
   preparing an advertising analysis, comprising bar graphs detailing measured aspects.

* * * * *

UNITED STATES PATENT AND TRADEMARK OFFICE
CERTIFICATE OF CORRECTION

PATENT NO. : 7,543,229 B2
APPLICATION NO. : 11/190377
DATED : June 2, 2009
INVENTOR(S) : Jose Abad Peiro et al.

It is certified that error appears in the above-identified patent and that said Letters Patent is hereby corrected as shown below:

In column 10, line 52, in Claim 5, before "the" delete "view" and insert -- view, --, therefor.

In column 11, line 15, in Claim 8, delete "document:" and insert -- document; --, therefor.

In column 12, line 55, in Claim 15, delete "sizes" and insert -- sizes; --, therefor.

Signed and Sealed this

Fourteenth Day of September, 2010

David J. Kappos
*Director of the United States Patent and Trademark Office*